June 1, 1943.  S. J. BAILEY  2,320,504
BINOCULARS
Original Filed Feb. 9, 1940
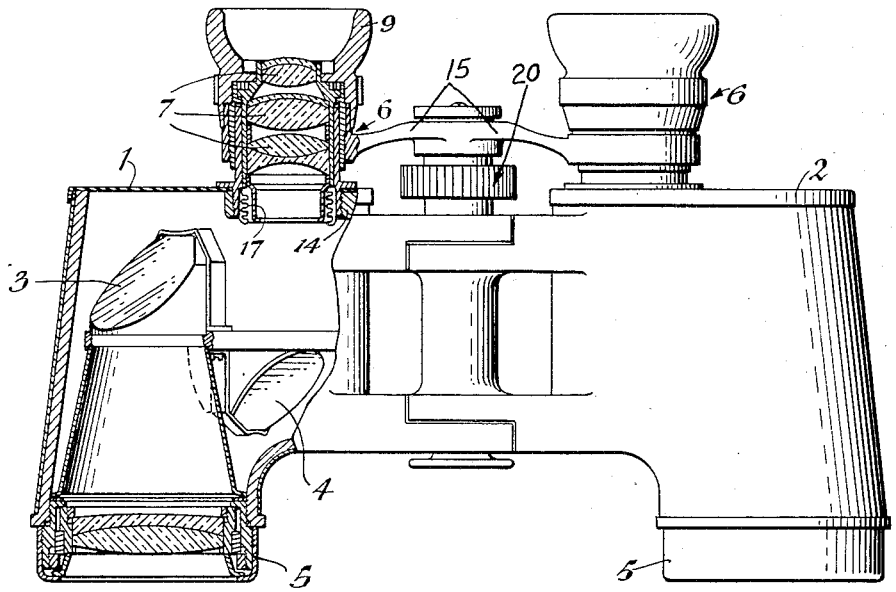
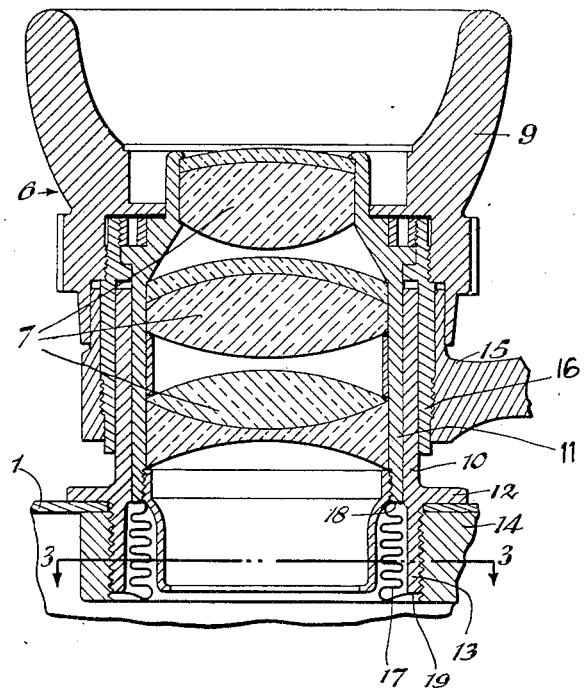
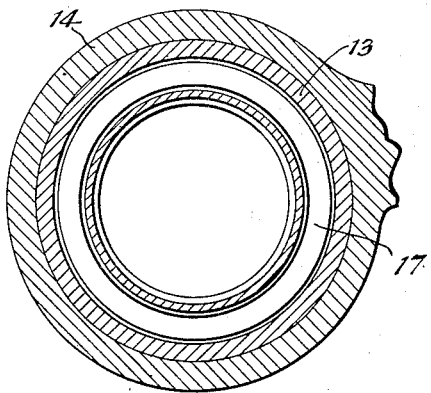
INVENTOR
STANLEY J. BAILEY
BY
Raymond A. Paquin
ATTORNEY Patented June 1, 1943

2,320,504

UNITED STATES PATENT OFFICE 2,320,504

BINOCULAR

Stanley J. Bailey, Snyder, N. Y., assignor to Spencer Lens Company, Buffalo, N. Y., a corporation of New York Original application February 9, 1940, Serial No. 318,128. Divided and this application June 19, 1941, Serial No. 398,729

6 Claims. (Cl. 88—34)

This invention relates to binoculars or the like and more particularly to a new and improved eyepiece for binoculars which will prevent the entrance of dust or moisture into the casings.

This application is a division of my application filed February 9, 1940, Serial No. 318,128.

An object of the invention is to provide an improved eyepiece for binoculars and an improved means and method for connecting the parts of said eyepiece.

Another object of the invention is to provide an improved means and method of constructing a focusing eyepiece for a binocular which will prevent the entrance of dust and moisture into the casing through the eyepiece.

Another object of the invention is to provide a new and improved focusing eyepiece for a binocular or the like which will allow the parts to be adjusted relative to each other to focus the eyepiece and yet prevent the entrance of dirt and moisture into the body between said adjustable parts.

Other objects and advantages of the invention will be apparent from the following description taken in connection with the accompanying drawing, and it will be understood that many changes may be made in the details of construction and arrangement of parts without departing from the spirit of the invention as expressed in the accompanying claims. I theerfore do not wish to be limited to the exact details of construction and arrangement of parts shown and described as the preferred form has been shown by way of illustration only.

Referring to the drawing:

Fig. 1 is a plan view, partly in section, of a pair of binoculars embodying the invention;

Fig. 2 is an enlarged fragmentary view of Fig. 1; and

Fig. 3 is a sectional view taken on line 3—3 of Fig. 2 looking in the direction of the arrows.

In prior art binocular and other constructions embodying focusing eyepiece, trouble has been caused by dust or moisture seeping between the moving parts of the eyepieces into the casings. This duct and/or moisture would then gather on the surfaces of the lens elements in the casings and corrosion and reduced vision through the lens elements were caused thereby.

It is therefore the principal object of this invention to provide a new and improved arrangement for constructing the focusing eyepieces of a binocular or the like wherein the parts may be easily and economically assembled and wherein the entrance of moisture or dust into the casings is prevented.

Referring more particularly to the drawing wherein similar reference characters designate corresponding parts throughout the several views, the device embodying the invention comprises a pair of casings 1 and 2 each containing the prisms 3 and 4 and having the objectives 5 at the front ends thereof.

The casings 1 and 2 each have secured thereto an eyepiece 6 containing the lens elements 7 and are each adapted to be secured on the casings 1 and 2 in alignment with one of the prisms 4 to allow light to be reflected by said prism 4 through said eyepiece into the eye of an observer.

The casings 1 and 2 are pivotally secured together to allow the casings to be adjusted, that is, the distance between the casings changed so that the eyepieces are spaced apart to the proper pupillary distance to meet the requirements of the particular user and also this adjustment may be quickly and easily varied to meet the requirements of other users to allow the binoculars to be used by other users. To allow this adjustment the casings 1 and 2 are pivotally connected by means of the hinge member 8.

The eyepieces 6 as shown in section in Fig. 2 each comprise the eye cup member 9 adapted to engage the face around the eye of the user of the binoculars and the telescoping tubular members 10 and 11. The tubular member 10 has the circumferential flange 12 adapted to engage the outer edge of the casing 1 surrounding the opening therethrough and the extension 13 on the member 10 is adapted to extend into the casing and has the threaded portion which threadedly engages the threaded bore on the annular supporting block 14 which is secured to the inner wall of the casing 1 adjacent the said opening.

The lenses 7 are retained in fixed relation in the tube 11. To focus the eyepiece for the particular user the tube 11 is moved in or out to change the relative position of the lenses 7 with respect to the prism 4. This movement of the lenses 7 as a unit is effected by rotating the wheel or sprocket 20 which moves the arms 15 back and forth depending on the direction of rotation of said wheel 20. The arms 15 are each threadedly connected to a tubular member 16 which is in turn connected to the tubular member 11 containing the lenses 7 so that movement of the arm 15 back or forth simultaneously causes similar movement of the tube 11.

It has been found that in the past, movement of the parts as stated above to move the tubular member 11 containing the lenses 7 to the proper focus will cause the entrance of moisture and dust into the casing through the space between the tubular members. It will be seen that these parts must be fitted together loosely enough so that they can be moved relative to each other without binding, and this looseness may allow the entrance of moisture and/or dust into the interior of the casing.

To prevent the entrance of such moisture or dust, I have provided the bellows arrangement 17.

This bellows arrangement 17 may be formed of metal, rubber or other suitable material and has one end 18 secured to the bottom of the tubular member 11 and the other end 19 secured to the bottom of the extension 13 on the tubular member 10.

Because of this bellows arrangement the tubular member 11 is free to be moved in or out relative to the tubular member 10, as stated above, without any entrance of dust or moisture into the interior of the casing. The bellows 17 will of course be extended with the movement of the end of the member 11 away from the end of the member 13 and will then fold when said members are moved nearer to each other. In other words, the bellows will expand or fold according to the direction in which the member 11 is adjusted relative to the member 10.

It is pointed out that while the bellows arrangement has been shown applied to a center focusing structure that it is equally applicable to a construction employing an independent focusing arrangement for the individual eyepieces.

It is also pointed out that with this construction the interior of the casing may be filled with nitrogen or desiccated air to prevent fogging of the prisms and lenses in sudden temperature changes and the loss of said nitrogen or desiccated air through the space between the tubes 10 and 11 will be prevented by the bellows arrangement described herein as will also the entrance of dust and air be prevented, and therefore no corrosion or damage can occur to the surfaces of the lenses in the casing and thereby I have overcome the disadvantages found in such constructions in the prior art.

Due to the fact that the ends of the bellows are secured to the ends of the tubes 11 and 13 respectively, the eyepiece may be easily and quickly removed from or secured to its connection with the casing as a unit without the necessity of making any special connections between said eyepiece and the said casing.

From the foregoing it will be seen that I have provided simple, efficient and economical means for accomplishing all of the objects of the present invention and overcoming the disadvantages of prior art types of binoculars, whereby the focusing eyepieces of binoculars may be so formed as to prevent the entrance of dust or moisture into the interior of the casing through the focusing arrangement of the eyepiece.

Having described my invention, I claim:

1. In a device of the character described, for use with a casing supporting optical elements and having an opening, an eyepiece adapted to be secured to said casing in alignment with said opening, said eyepiece having a stationary member adapted to be secured to said casing adjacent said opening to retain said eyepiece in alignment with said opening and a movable member supporting optical elements in optical alignment with the optical elements in the casing and adapted to be adjusted relative to said optical elements in the casing by adjustment of said movable member relative to said stationary member and an extensible collapsible shield member secured adjacent one end of said shield member to said stationary member and adjacent the opposite end of said shield member to said movable member and said shield member being provided for preventing the entrance of dust and moisture between the stationary and extensible members and into the interior of said casing through the said eyepiece.

2. An eyepiece for use in a binocular or the like, said eyepiece having a tubular member adapted to be secured to said casing to retain said eyepiece on said casing and a second tubular member in telescoping relation with said first tubular member and supporting optical elements and a shield member of collapsible material secured adjacent one end to said first tubular member adjacent the end of said member and said shield member being secured to said second tubular member adjacent the end thereof and said shield member being provided for preventing the entrance of dust and moisture between the tubular members and into the interior of the casing through the said eyepiece.

3. In a device of the character described, a casing having an opening, an eyepiece secured to said casing in alignment with said opening, said eyepiece having a tubular member secured to said casing adjacent said opening to retain said eyepiece in alignment with said opening and a second tubular member in telescoping relation with said first tubular member and a collapsible shield member secured adjacent one end thereof adjacent the end of said first tubular member and adjacent its opposite end adjacent the end of said second tubular member and said shield member being provided for preventing the entrance of dust and moisture between the tubular members and into the interior of the casing through said eyepiece.

4. In a device of the character described, a casing having an opening, an eyepiece adapted to be secured to said casing in alignment with said opening, said eyepiece having a stationary member adapted to be secured to said casing adjacent said opening, a movable member adapted to be adjusted relative to said stationary member and a bellows member secured adjacent one end to said stationary member and adjacent its opposite end to said movable member and adapted to prevent the entrance of dust and moisture into the casing through the said eyepiece.

5. An eyepiece for use in a binocular or the like, said eyepiece having a stationary member adapted to be secured to said casing and a movable member adapted to be adjusted relative to said stationary member and a bellows member secured adjacent one end to said stationary member and adjacent its opposite end to said movable member and adapted to prevent the entrance of dust and moisture into the casing through the said eyepiece.

6. In a device of the character described, a casing having an opening, an eyepiece secured to said casing in alignment with said opening, said eyepiece having a stationary member secured to said casing adjacent said opening to retain said eyepiece in alignment with said opening, a movable member in telescoping relation with and adjustable relative to said stationary member and a bellows member secured adjacent one end thereof adjacent the end of said stationary member and adjacent its opposite end adjacent the end of said movable member and adapted to prevent the entrance of dust and moisture into the casing through said eyepiece.

STANLEY J. BAILEY.